United States Patent [19]

Yoder

[11] 4,049,310

[45] Sept. 20, 1977

[54] RECREATIONAL VEHICLE WITH EXPANSIBLE SECTION

[76] Inventor: Perry E. Yoder, 602 Middlebury St., Goshen, Ind. 46526

[21] Appl. No.: 642,681

[22] Filed: Dec. 22, 1975

[51] Int. Cl.² .............................................. B62D 33/08
[52] U.S. Cl. ...................................................... 296/26
[58] Field of Search ...................... 296/26, 23 C, 23 R

[56] References Cited

U.S. PATENT DOCUMENTS

| 2,606,057 | 8/1952 | Johnson | 296/23 C |
| 2,704,223 | 3/1955 | Houdart | 296/26 |
| 3,572,809 | 3/1971 | Buland | 296/26 X |
| Re. 24,452 | 4/1958 | Meaker | 296/23 C |

FOREIGN PATENT DOCUMENTS 2,000,083   6/1971   Germany ........................... 296/23 C Primary Examiner—Joseph F. Peters, Jr.
Assistant Examiner—John A. Pekar
Attorney, Agent, or Firm—Oltsch & Knoblock

[57] ABSTRACT

A recreational vehicle with an expansible section is provided with means accommodating extension and retraction of the section with minimum physical exertion, means to guide the movement of the expansible section to prevent binding and improper positioning thereof, and means effectively sealing the vehicle body at the extension-receiving opening thereof in both extended and retracted positions of the expansible section.

6 Claims, 22 Drawing Figures

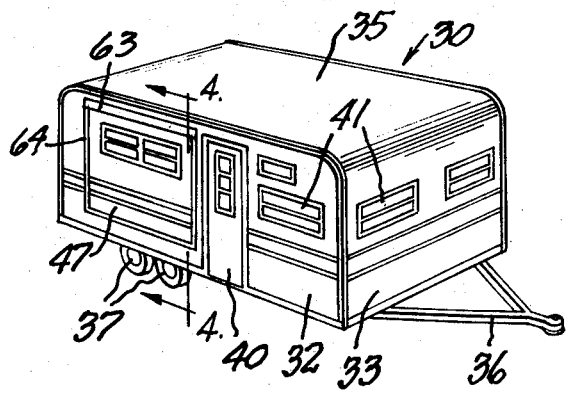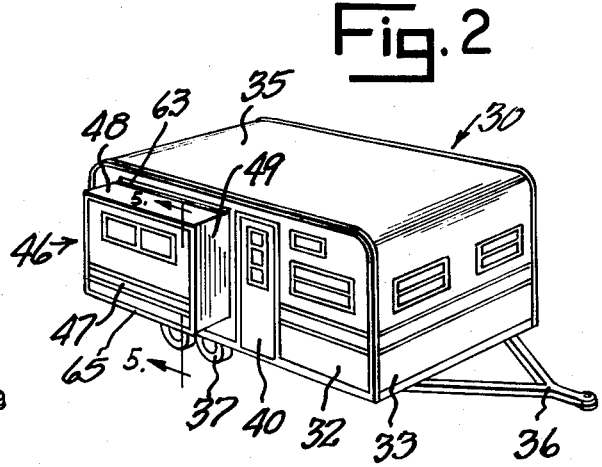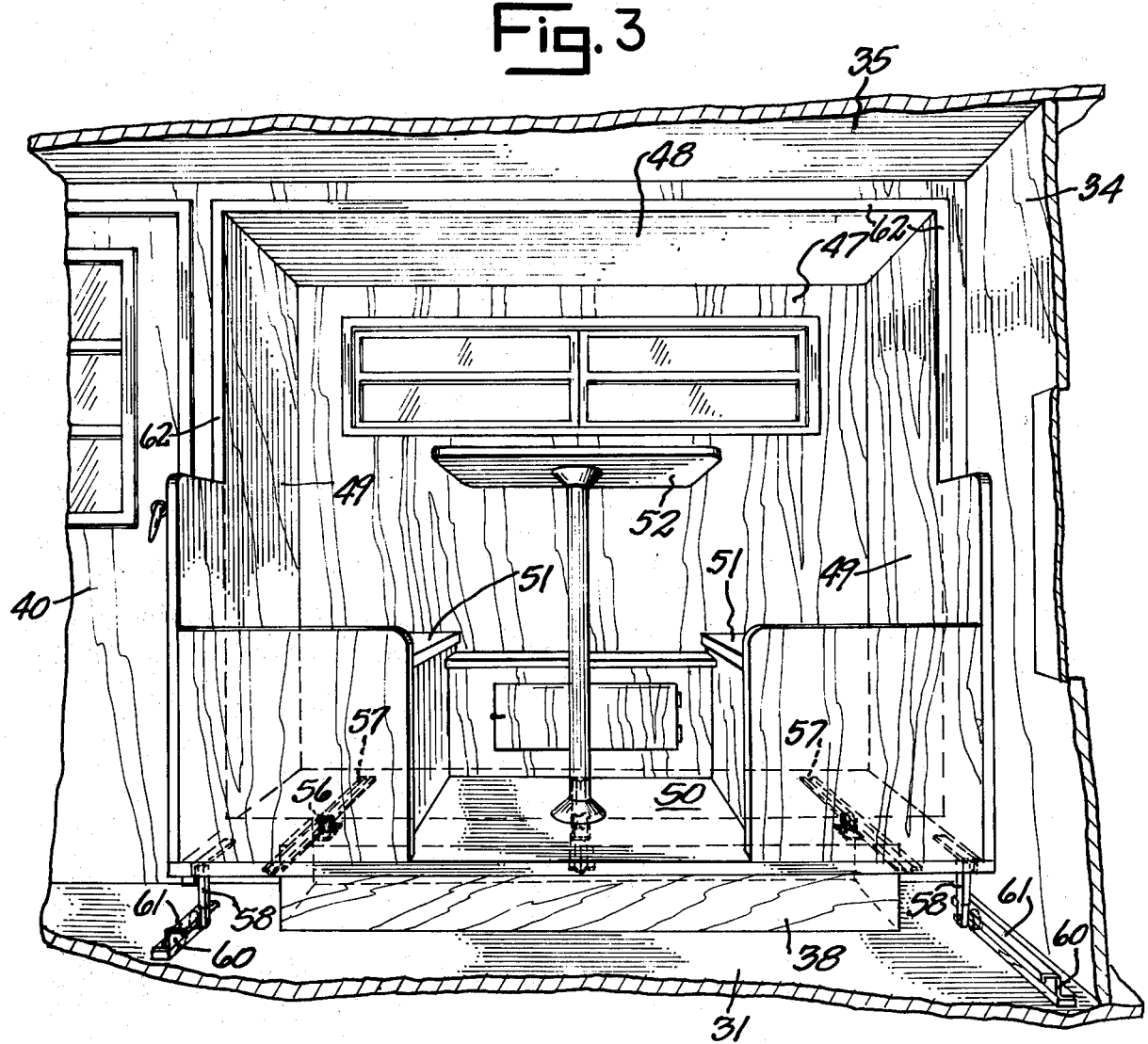

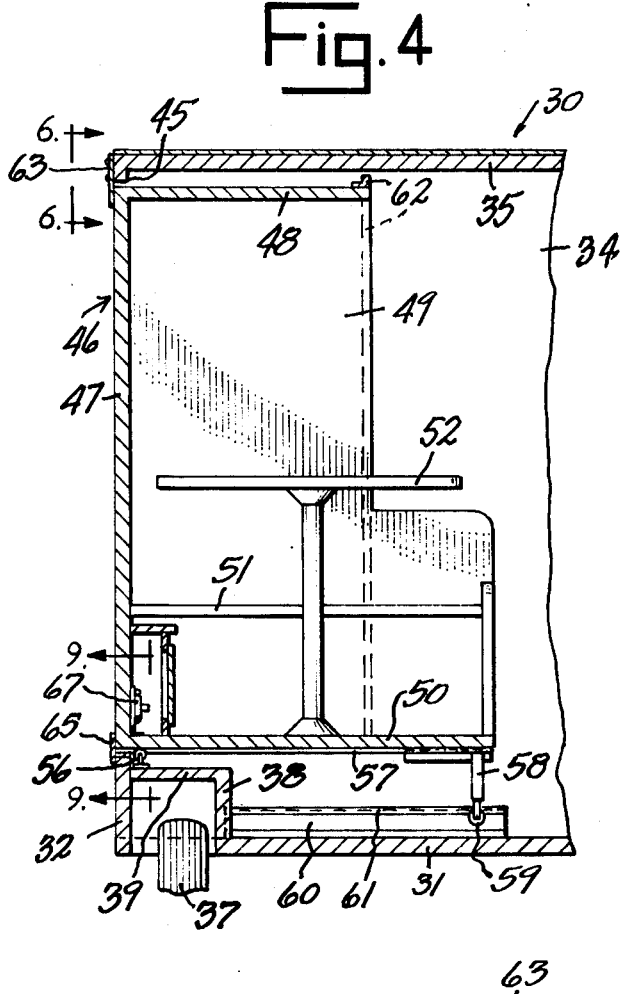
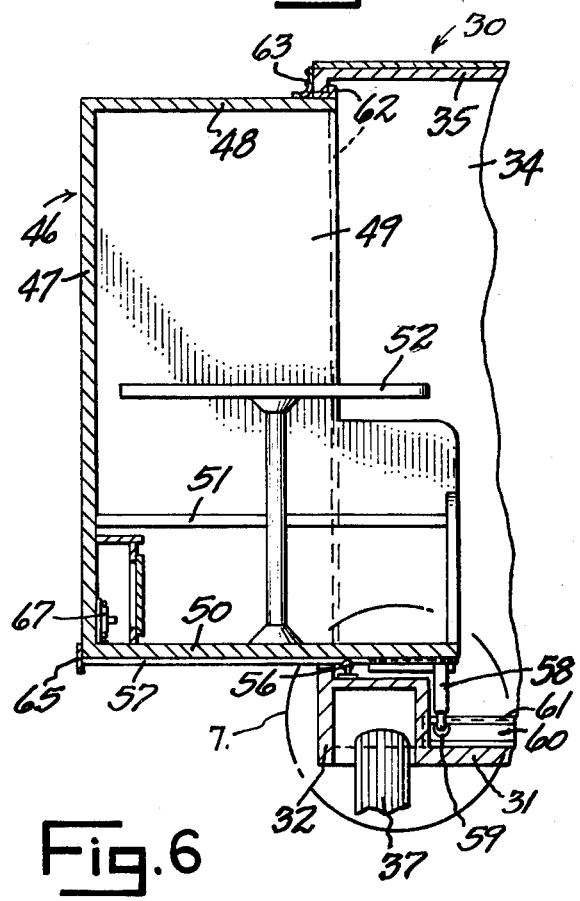
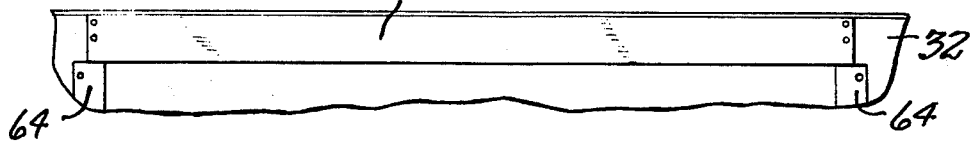
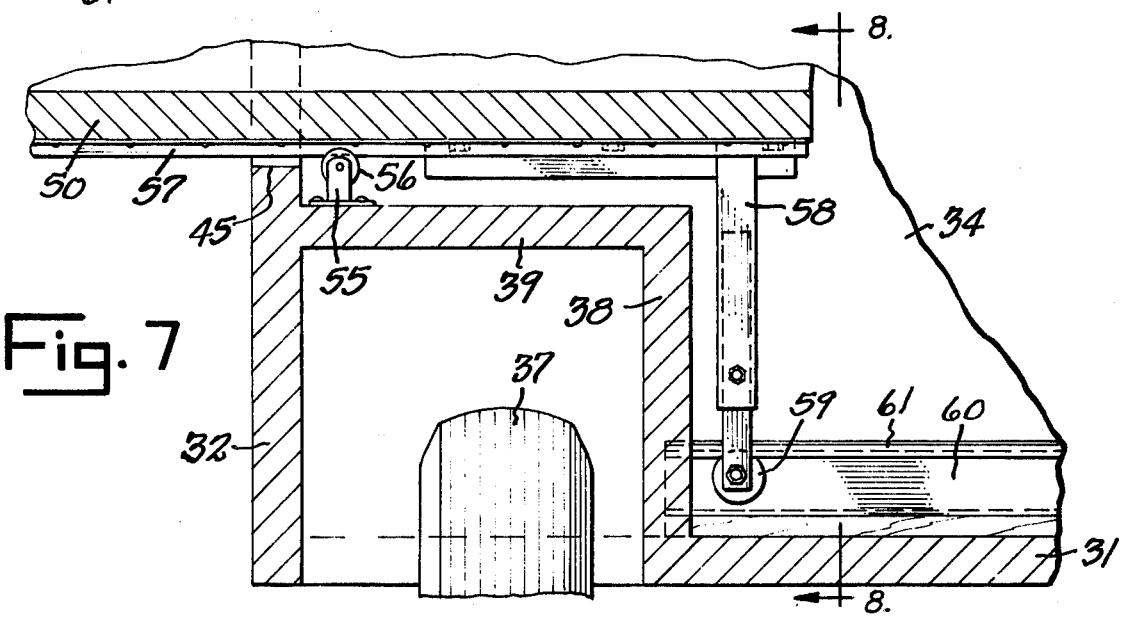

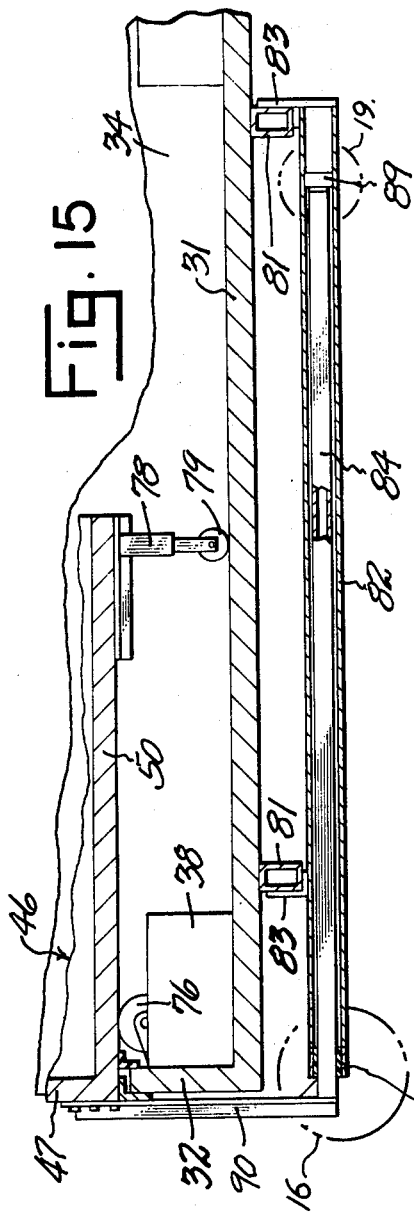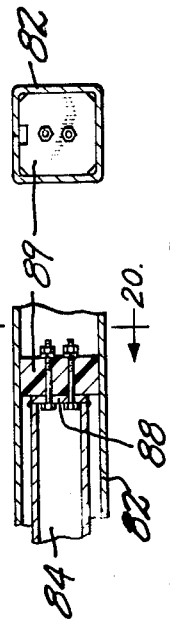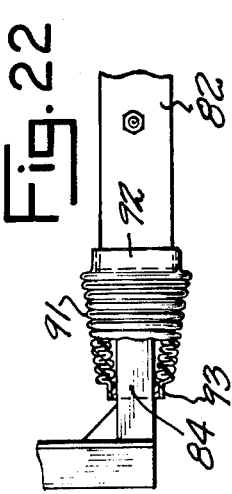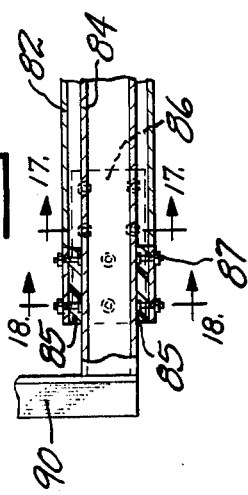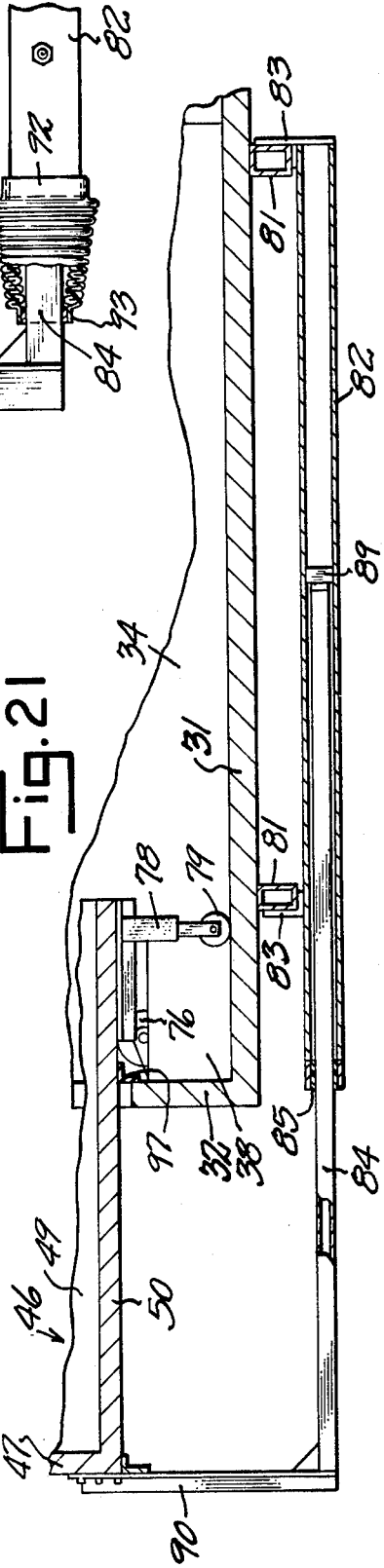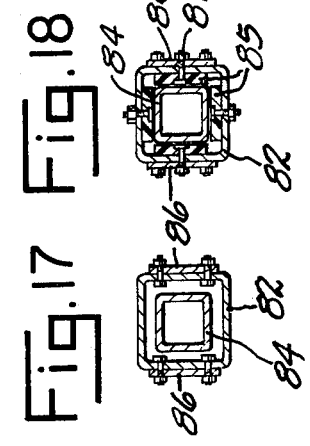

RECREATIONAL VEHICLE WITH EXPANSIBLE SECTION

This invention relates to improvements in recreational vehicles with expansible sections, and more particularly to a vehicle such as a travel trailer or camper having an extensible portion constituting a dinette.

Recreational vehicles are characteristically compact in order to provide accommodations for cooking, eating, resting and other activities of a group of occupants within the vehicle, such as a family. One of the problems in such vehicles concerns the provision of ample and comfortable accommodations arranged to permit occupants to move freely from place to place in the vehicle during normal activities, such as preparation of meals. In providing dining accommodations for four or more persons in a recreational vehicle it is desirable to arrange furniture and utilities in a manner which does not impede or unduly restrict the activities of the users during cooking and serving food and during such times as a dining table is used for writing, studying or playing cards or other games. Restrictions to free movement are inherent in the usual narrow width of the vehicle.

Some efforts have been made heretofore to overcome the problems of space limitations in recreational vehicles by providing expansible sections. Prior developments of this character have been characterized by numerous disadvantages, such as great bulk and weight of the extensible section which makes manual extension and retraction thereof difficult; difficulty of accommodating expansion without interference from the wheel support of the unit; high cost of such extension units; substantial restriction of access to adjacent portions of the vehicle when the extension part is retracted, and the like.

It is the primary object of this invention to overcome the handicaps and limitations of prior constructions of vehicles with expansion sections.

A further object is to provide a construction and mounting of an expansible section on a vehicle of a nature which provides an effective seal of the vehicle at the opening receiving the expansible section when in expanded and in retracted positions.

A further object is to provide a construction of this character which may utilize space in the region of the wheel well of a vehicle without detracting from required ease of operation, or the stability of the expansible section when extended.

A further object is to provide a construction of this character having means for effectively guiding the expansible section in its movement between expanded and retracted positions so as to prevent binding or disalignment of the expansible section or interference with free movement thereof between extended and retracted positions.

A further object is to provide a vehicle with an expansion section having means for guiding movement of the expansible section which operates freely, which is inexpensive, which provides minimum interference with the free movement of occupants in the vehicle in both expanded and retracted positions of the expansible section, and which avoids unsightly or hazardous parts.

Other objects will be apparent from the following specification.

In the drawings:

FIG. 1 is a perspective view of a vehicle having an expansible section in its closed position.

FIG. 2 is a perspective view of a vehicle having an expansible section in its extended position.

FIG. 3 is a fragmentary interior perspective view illustrating the expansible section in its expanded position.

FIG. 4 is a fragmentary transverse vertical sectional view taken on line 4—4 of FIG. 1 illustrating the expansible section in its retracted position.

FIG. 5 is a fragmentary transverse vertical sectional view taken on line 4—4 of FIG. 1 and illustrating the expansible section in its extended position.

FIG. 6 is a fragmentary side elevational view as viewed in the direction of arrows 6—6 of FIG. 4.

FIG. 7 is an enlarged fragmentary detail sectional view of the portion of the vehicle enclosed in the circle 7 of FIG. 5.

FIG. 15 is a fragmentary vertical transverse sectional view taken on line 15—15 of FIG. 12.

FIG. 16 is an enlarged fragmentary transverse vertical sectional view of the portion enclosed in the circle 16 in FIG. 15.

FIG. 17 is a vertical sectional view taken on line 17—17 of FIG. 16.

FIG. 18 is a vertical sectional view taken on line 18—18 of FIG. 16.

FIG. 19 is an enlarged fragmentary sectional detail view of the portion enclosed in the circle 19 in FIG. 15.

FIG. 20 is a transverse sectional view taken on line 20—20 of FIG. 19.

FIG. 21 is a fragmentary transverse vertical sectional view similar to FIG. 15, but illustrating the expansion member in its extended position.

FIG. 22 is a detail view, with parts shown in section, which illustrates a modified embodiment of the parts shown in circle 16 of FIG. 15.

DESCRIPTION OF THE PREFERRED EMBODIMENTS

Figure 8:
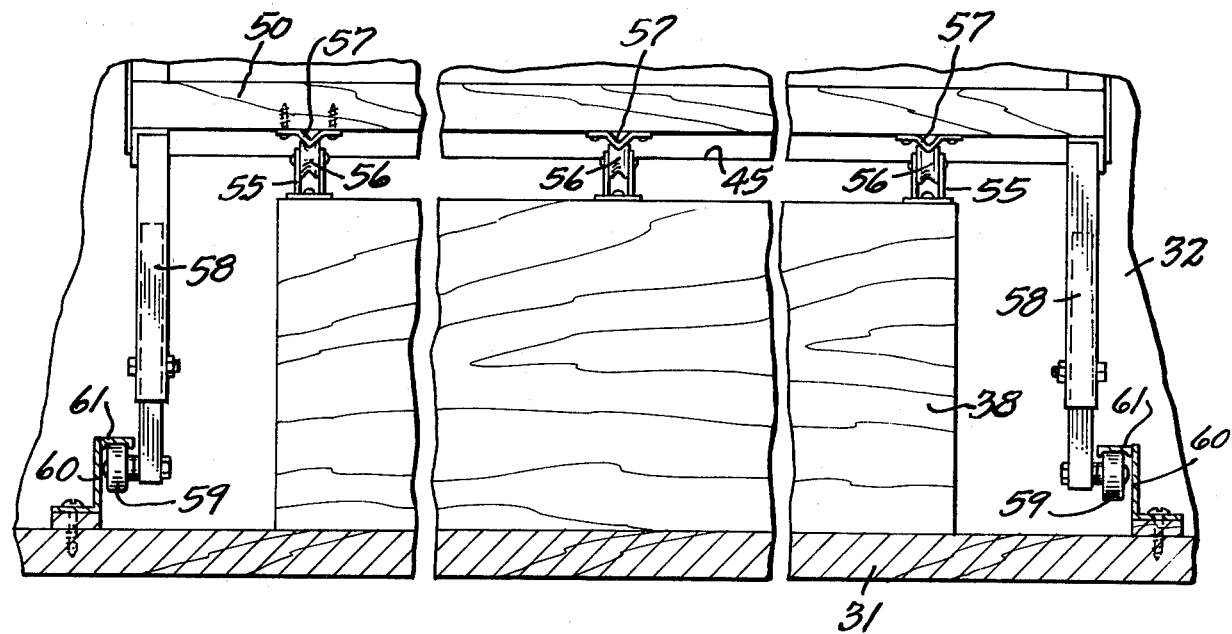
FIG. 8 is a fragmentary vertical sectional view taken on line 8—8 of FIG. 7.

Referring to the drawings, and, particularly, to FIGS. 1 through 9 which illustrate one embodiment of the invention, the numeral 30 designates a recreational vehicle, such as a travel trailer or camper, having a body including a floor 31, opposite side walls 32, front wall 33, rear wall 34, and roof 35. The vehicle body is provided with a forwardly projecting A-frame and hitch unit 36 and is mounted upon wheels 37 by suitable wheel suspension means (not shown). Wheel wells 38 interrupt the floor 31 to accommodate low mounting or ground clearance of the vehicle body by accommodating portions of the wheels 37 with clearance, as well understood in the art, each wheel well including a top panel 39. The vehicle body is provided with one or more access openings each closed by a door 40, and with window openings in which windows 41 are mounted. The vehicle body may be of a length up to 35 feet and is of a width in the order of 8 feet, and is adapted to be towed by an automotive vehicle.

One side wall 32 has a large opening 45 formed therein, preferably above a wheel well 38. The opening 45 may be of a height extending from a point slightly above the level of the top 39 of a wheel well to a level just below the level of the roof 35, and is of a length to accommmodate a body extension 46, such as an extension to accommodate a dinette. The body extension includes an outer wall 47, a top wall 48, end walls 49 and a floor or bottom panel 50. The floor 50 and at least the lower portions of the side walls 49 are of greater width than the top wall 48 by a dimension slightly greater than the width of a wheel well 38. Where an extension is to serve as a dinette seats 51 are built therein at the opposite ends thereof and a table 52 is supported centrally on the floor 50 between the seats. The dimensions of the body extension are such that it fits with slight clearance in the body opening 45 to permit shifting thereof between the retracted position as shown in FIGS. 1 and 4 and extending position as illustrated in FIGS. 2, 3 and 5.

In the construction illustrated in FIGS. 1 to 9 a plurality of cooperating guide tracks and rollers are provided to accommodate movement of the extension 46 between its retracted and extended positions. Thus, as illustrated, a plurality of brackets 55 mounted in spaced relation on the top 39 of the wheel well near vehicle side wall 32 respectively journal rollers 56 which are preferably of a V-contour and upon each of which bears one of a set of spaced parallel elongated V-tracks 57 secured to and projecting below and transversely of the floor 50 of the extension.

Adjacent the opposite inner corners of the extension floor 50 are fixedly mounted downwardly projecting struts 58 each journaling a roller 59 at its lower end. Each roller 59 traverses one of two parallel tracks 60 carried by the vehicle floor 31. Each track includes a top horizontal flange 61 beneath which a roller 59 is positioned and against which said roller bears.

The weight of the body extension 46 is borne or supported by the rollers 56 and V-tracks 57, while the rollers 59 engaging the track flanges 61 restrain downward outward tilting of the body extension 46 when in its extended position. The extended position of the extension unit 46 is delineated by stop means carried by the extension, such as top stop flange and side stop flanges 63 carried by extension wells 49.

Suitable means may be provided to seal the opening in which the body extension 46 is mounted. Such means may include a top strip 63 of rubber or other resilient material anchored to the body side 32 above the opening 45 and projecting into the opening to engage and bear upon the top 48 of the extension 46 in its extended position and to bear against the upper margin of the outer side wall 47 of the extension 46 in its retracted position. Resilient vertical sealing strips 64 are carried by the vehicle wall 32 at opposite ends of the opening 45 and bear against the outer wall 47 or the side walls 49 of the extension 46. A bottom sealing strip 65 may be carried by the outer extension wall 47 to project therebelow and engage the side wall 32 below the opening 45 in the closed position of the body extension 46.

Figure 9:
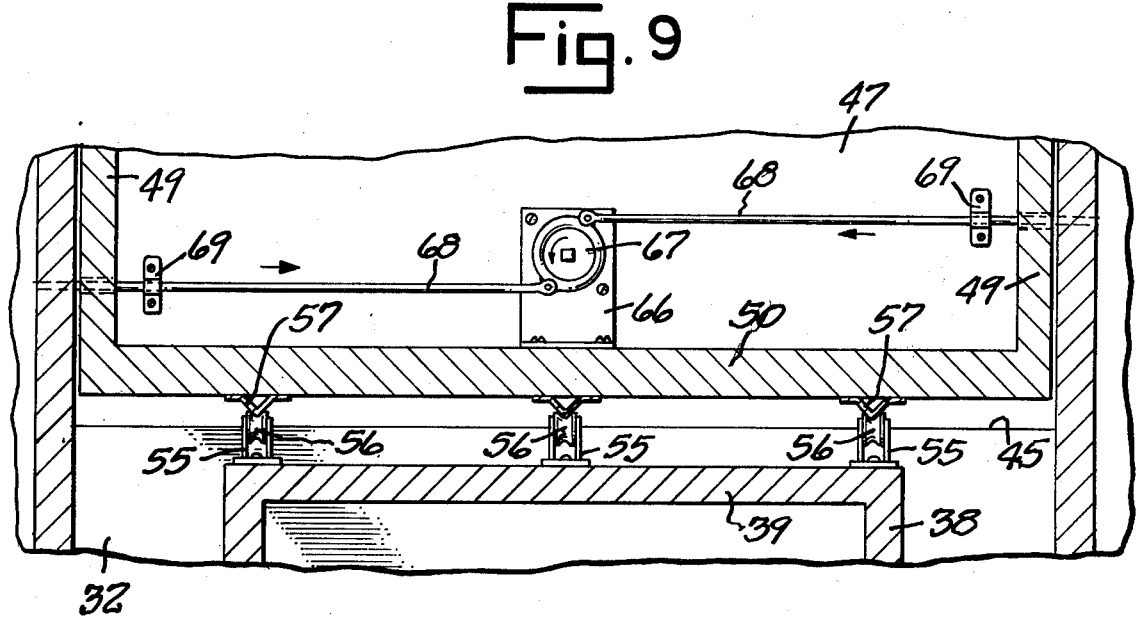
FIG. 9 is a fragmentary vertical sectional view taken on line 9—9 of FIG. 4.

Any suitable locking means may be provided to lock the body extension 46 in retracted position during travel. One such means is illustrated in FIG. 9 wherein a bracket 66 is secured at the lower central portion of the inner face of the outer body extension wall 47. Bracket 66 journals a rotatable actuator 67. At diametrically opposed marginal points of the actuator are pivoted elongated lock rods 68 extending alongside wall 47 and shiftably positioned in guides 69 carried by wall 47 adjacent the opposite extension walls 49. Registering openings are formed in extension walls 49 and in adjacent portions of the vehicle body to receive the outer end portions of the rods 68 in one operative position of the actuator when the body extension 46 is retracted. Rotation of the actuator 67 serves to withdraw the locking rods from the openings in the vehicle body to thereby release the extension for outward travel from the FIG. 4 to the FIG. 5 position, and to return the locking rods to locking position.

Figure 10:
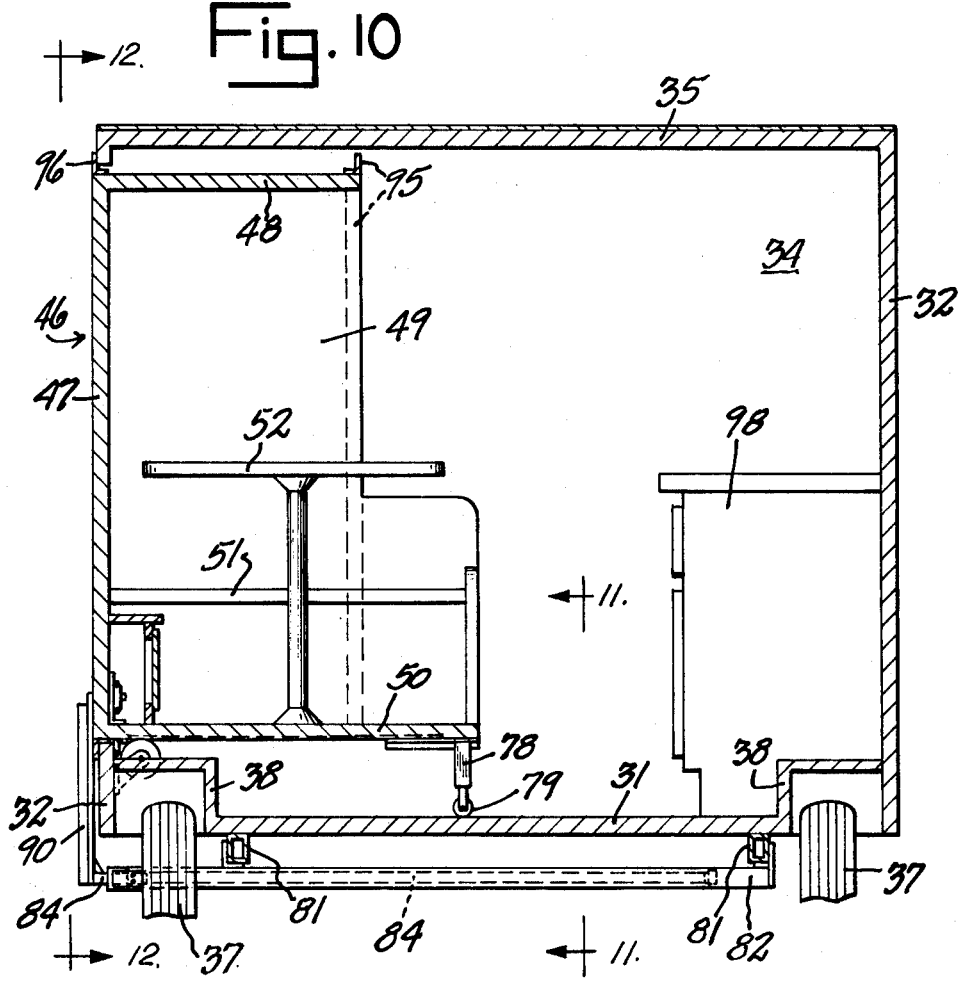
FIG. 10 is a vertical sectional view taken on line 4—4 of FIG. 1 and illustrating a modified embodiment of the invention.

It will be seen that the arrangement is such that the body extension 46 is retracted and locked within the vehicle body during travel and is easily unlocked and shifted to extended position with minimum physical exertion when the vehicle is stationary. The portion of space in the vehicle body which is occupied by the extension 46 when in its retracted position does not substantially exceed the space occupied by dining facilities in a conventional recreational vehicle. However, upon outward movement of the extension 46 to the position shown in FIGS. 2, 3 and 5, the free or usable space within the vehicle body is enlarged and the area thereof adjacent to the extension 46, which is usually located at the side of the vehicle opposite the kitchen facilities 98 of the vehicle, (FIG. 10) is freed so as to provide freedom of movement of occupants between the kitchen and the dinette. At the same time, when extended, adequate seating for four people around a table is provided for dining and for other usage, such as playing games. The rollers and tracks render movement of the body extension between retracted and extended positions easy to accomplish without undue physical exertion, and the tracks provide guides preventing disalignment and binding of the body extension 46. It will also be observed that the vehicle is weather-tight and properly sealed in both extended and retracted position of the body extension 46.

An alternate embodiment of the invention is illustrated in FIGS. 10-22 inclusive wherein the parts of the vehicle body and the body extension bear the same reference numerals used in FIGS. 1 to 9 inclusive. In this embodiment, tracks within the vehicle body for guiding the extension and retraction movement of the body extension 46 are eliminated.

Figure 11:
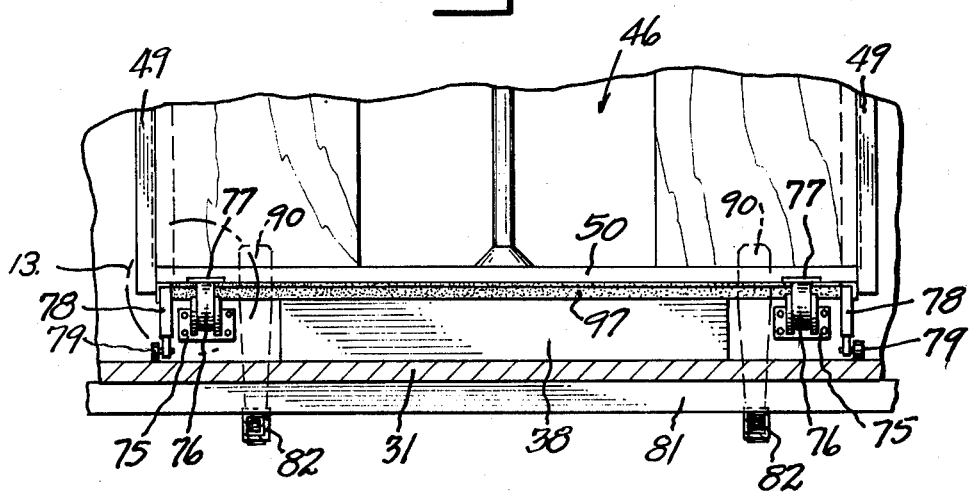
FIG. 11 is a fragmentary vertical sectional view taken on line 11—11 of FIG. 10.
Figure 12:
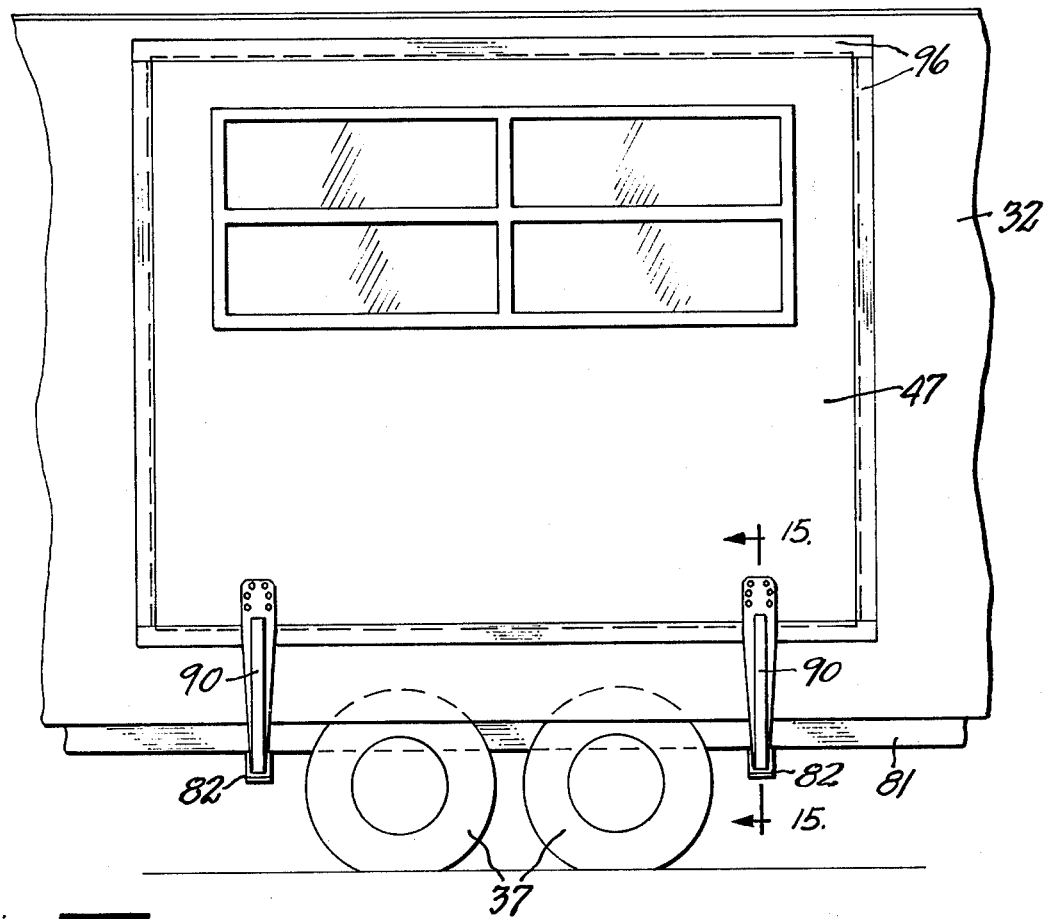
FIG. 12 is an outer fragmentary elevational view of the vehicle illustrating the expansible portion as viewed in the direction of arrows 12—12 of FIG. 10.
Figure 13:
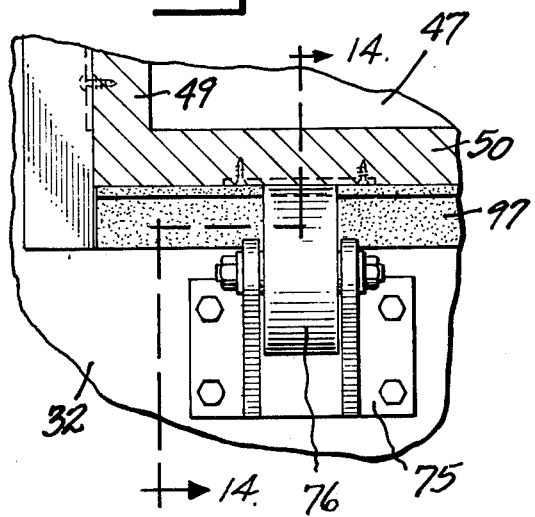
FIG. 13 is an enlarged fragmentary sectional detail view of the portion enclosed in circle 13 of FIG. 11.

Two or more roller brackets 75 carried by the vehicle side wall 32 below the opening 45 adjacent opposite ends of said opening provide means journaling rollers 76 which bear upon and support spaced parts of the floor 50 of the body extension 46, the same preferably being located adjacent opposite ends of the wheel well 38, as best seen in FIG. 11. If desired, metal wear plates 77 may be secured to the bottom surface of the extension floor 50 for engagement by the rollers 76.

Struts 78 are fixedly carried by and depend from the inner corners of the extension floor 50 and each journals a roller 79 engaging and traveling upon the vehicle floor 31.

Guiding of the travel of the body extension between inner and outer limits of movement is provided by means located exteriorly of the vehicle body. The vehicle body is supported by longitudinal frame members 81 which usually constitute metal tubes or channels underlying and supporting the vehicle floor 31. A pair of spaced parallel transverse metal tubes 82 are fixedly secured to the frame members 81 at spaced points by brackets 83 to extend in spaced parallel relation below and transversely of the vehicle floor 31. An elongated rigid tube or other structural member 84 has a telescoping sliding fit within each tube 82 and preferably has outer dimensions smaller than the inner dimensions of the tube 82. At the end of each tube 82 which terminates adjacent to the vehicle side wall 32 to which the extension receiving opening 45 is formed is mounted a plurality of guide blocks 85 at the interior of the four walls thereof, as best seen in FIGS. 16 and 18, said guide blocks 85 preferably being formed of material such as Teflon which accommodates free sliding thereagainst of the outer walls of the tube 84. If desired, elongated metal plates 86 may be secured to and extend along two or more outer sides of each tube 82. Plates 86 are preferably of greater length than the blocks 85 and serve to reinforce the end of the tube 82 and provide anchorage for securing members 87 which mount the blocks 85 and whose heads are countersunk at the inner faces of said blocks. Thus, the portion of each inner tube 84 adjacent the mouth of the cooperating outer tube 82 is firmly but slidably supported.

The innermost portion of each tube 84 is preferably spanned by an end wall 88, as best seen in FIG. 19, and to this end wall is fixedly secured an inner guide block 89 of dimensions to project laterally of tube 84 and fit snugly and slidably within the tube 82, as seen in FIGS. 19 and 20. Block 89 is preferably formed of Teflon or other material minimizing friction between contacting parts, and preferably is cutaway at the corners thereof, as seen in FIG. 20, to minimize danger of binding thereof in the outer tube 82.

At the outer end of each inner tube 84 is fixedly secured a rigid upwardly projecting arm 90 which is of a length to be secured fixedly to the lower portion of the outer wall 47 of the body extension.

In order to protect the portion of the inner tube 84 which projects beyond the end of the outer tube 82 in the extended position of the parts, a protective flexible sleeve 91 of accordion pleated character may be anchored at one end 92 to the outer tube 82, and may be anchored at its opposite end 93 to the inner tube 84, as best seen in FIG. 22. This ensures against the entry of foreign material into the open end of tube 82 and ensures against rusting or accumulation of foreign matter at the portion of tube 84 which is retracted into the tube 82.

Figure 14:
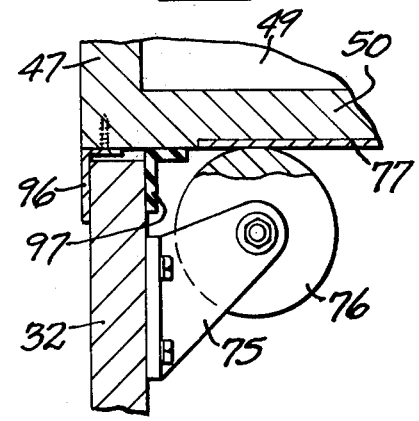
FIG. 14 is an enlarged fragmentary sectional detail view taken on line 14—14 of FIG. 13.

In this construction the seals between the vehicle body and the body extension are slightly different from those in the previous arrangement. Thus outwardly extending rigid flanges 95 are secured at inner ends of the top wall 48 and end walls 49 in a position to engage the inner surface of vehicle side wall 32 around the extension receiving opening 45 when the extension unit 46 is fully extended. Outwardly extending rigid flanges 96 are carried by the outer margins of the top wall 48, end walls 49 and floor 50 of the body extension 46 in position to bear against the vehicle side wall 32 around the extension receiving opening 45 thereof in the inner or retracted position of the body extension 46. A flexible sealing strip 97, preferably of L-shape in cross section as seen in FIG. 14, has a flange thereof secured to the inner face of vehicle wall 32 at the bottom of the extension receiving opening 45, and has a portion or flange thereof which bears against the bottom surface of the bottom wall or floor 50 of the extension 46.

The alternate construction described has the same advantages as the construction of FIGS. 1-9. An additional advantage of this construction is the elimination of tracks 60 mounted on the floor as required in the FIG. 1 embodiment, thus removing the element of possible hazard or risk that a user might trip upon those tracks in approaching or working near the extension when in its extended position, as at kitchen unit 98.

While the preferred embodiments of this invention have been illustrated and described, it will be understood that changes in the construction may be made within the scope of the appended claims without departing from the spirit of the invention.

What I claim is:

1. A recreational vehicle having a body including a floor and a side wall having an opening, an extension unit having an outer wall, a top wall, a floor and opposite end walls and shiftable in said body opening between a retracted position with its outer wall substantially flush with said vehicle side wall and an extended position projecting outwardly from said vehicle side wall, means for limiting outward movement of said extension unit, means for sealing said vehicle at said opening in the extended and retracted positions of said extension unit, a plurality of rollers supporting the floor of said extension unit at a plurality of points spaced laterally and longitudinally of the vehicle to accommodate movement between cantilevered extended position and retracted position, and means for guiding movement of said extension unit and preventing downward tilting of the outer part of said unit when in cantilevered extended position, some of said rollers being located adjacent the vehicle side wall to support a central portion of the floor of the extension unit, struts secured to and extending below inner corners of the floor of the extension unit toward said vehicle floor and each journaling a roller, said guide means including tracks carried by the floor of said extension unit engaging the rollers located adjacent to the vehicle side wall and having configurations complementary to the configurations of the rollers engaged thereby.

2. A vehicle as defined in claim 1, wherein said guide means also include a pair of parallel tracks mounted on the vehicle floor and each having a top flange, said strut journaled rollers engaging said tracks under said flanges.

3. A recreational vehicle having a body including a floor and a side wall having an opening, an extension unit having an outer wall, a top wall, a floor and opposite end walls and shiftable in said body opening between a retracted position with its outer wall substantially flush with said vehicle side wall and an extended position projecting outwardly from said vehicle side wall, means for limiting outward movement of said extension unit, means for sealing said vehicle at said opening in the extended and retracted positions of said extension unit, a plurality of rollers supporting the floor of said extension unit at a plurality of points spaced laterally and longitudinally of the vehicle to accommodate movement between cantilevered extended position and retracted position, and means for guiding movement of said extension unit and preventing downward tilting of the outer part of said unit when in cantilevered extended position, said guide means including a pair of rigid parallel guide members carried by the vehicle and positioned below the vehicle floor, a pair of rigid elongated members each shiftable parallel to and along a guide member and supported by said guide member, each of said last named members having an upward projection fixedly secured to the outer wall of said extension unit.

4. A vehicle as defined in claim 1, wherein said vehicle body includes a pair of spaced longitudinal floor supporting frame members, said guide means including a pair of spaced parallel rigid guide tubes anchored to said frame members below said vehicle floor and terminating adjacent said vehicle side wall, and a rigid tube having a telescoping sliding and guiding fit in each guide tube and having an upward projection secured to the outer wall of said extension unit.

5. A vehicle as defined in claim 1, wherein said guide means include a pair of rigid parallel guide tubes secured to said vehicle body below the floor thereof, a rigid tube having a telescopic fit in each guide tube and an upward projection secured to the outer wall of said extension unit, anti-friction slide blocks mounted within each guide tube at its outer end and engaged by the last named tube fitting therein, and an anti-friction block carried by the inner end of each last named tube and slidable in the cooperating guide tube.

6. A vehicle as defined in claim 5, wherein a flexible extensible sleeve is anchored to the free end of each guide tube and to the cooperating telescoped tube adjacent its upward projection, said sleeve encircling the portion of said tubes between said anchored ends.

* * * * *